July 14, 1936.  J. A. KENNEDY  2,047,271
INSULATED CABLE
Filed May 20, 1932   2 Sheets-Sheet 1
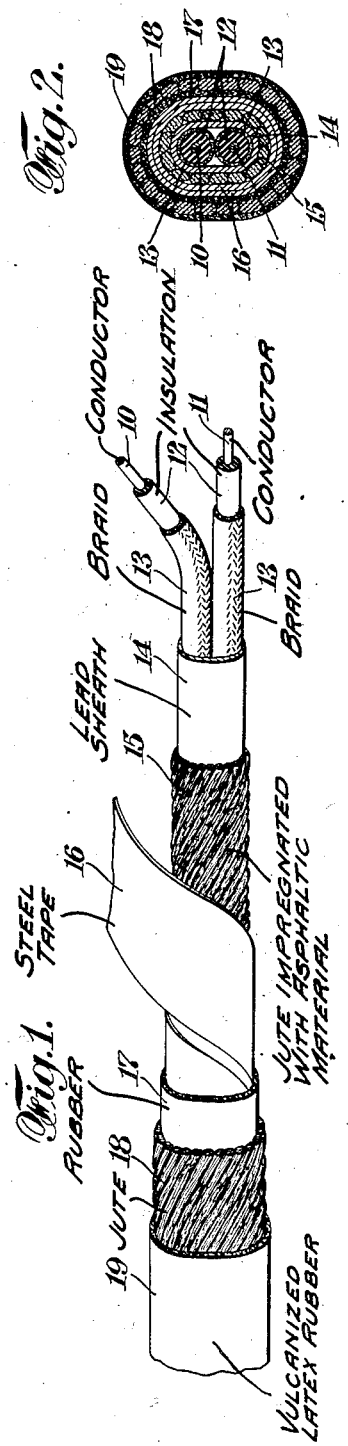
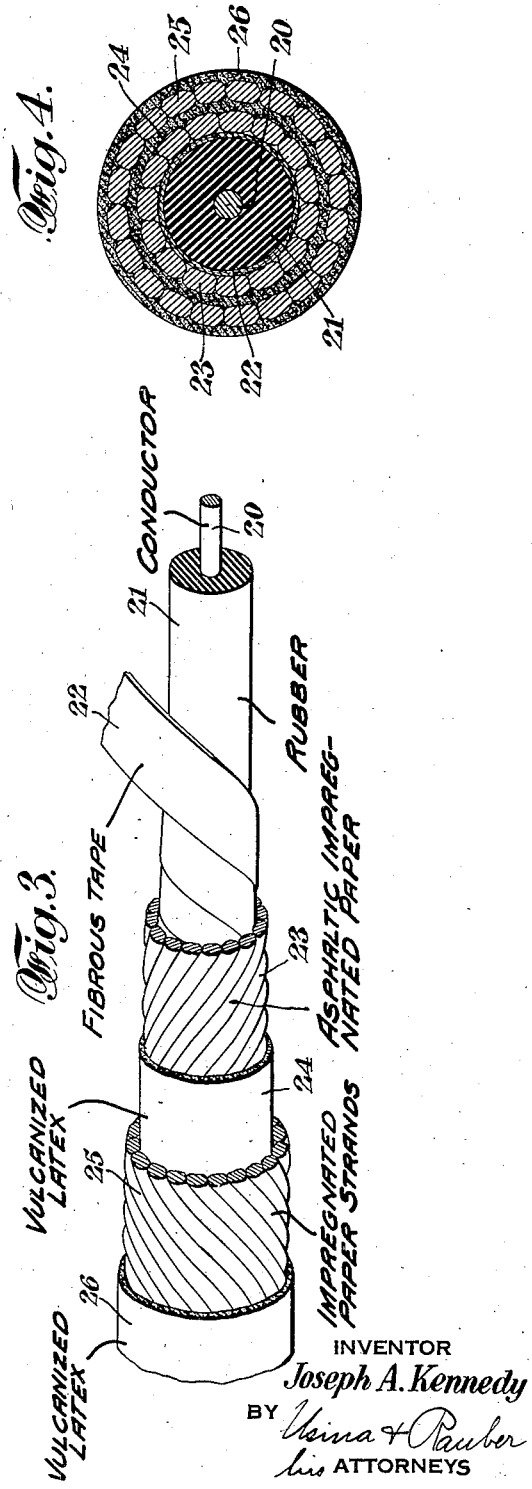
INVENTOR
Joseph A. Kennedy
BY
his ATTORNEYS July 14, 1936.   J. A. KENNEDY   2,047,271
INSULATED CABLE
Filed May 20, 1932   2 Sheets-Sheet 2
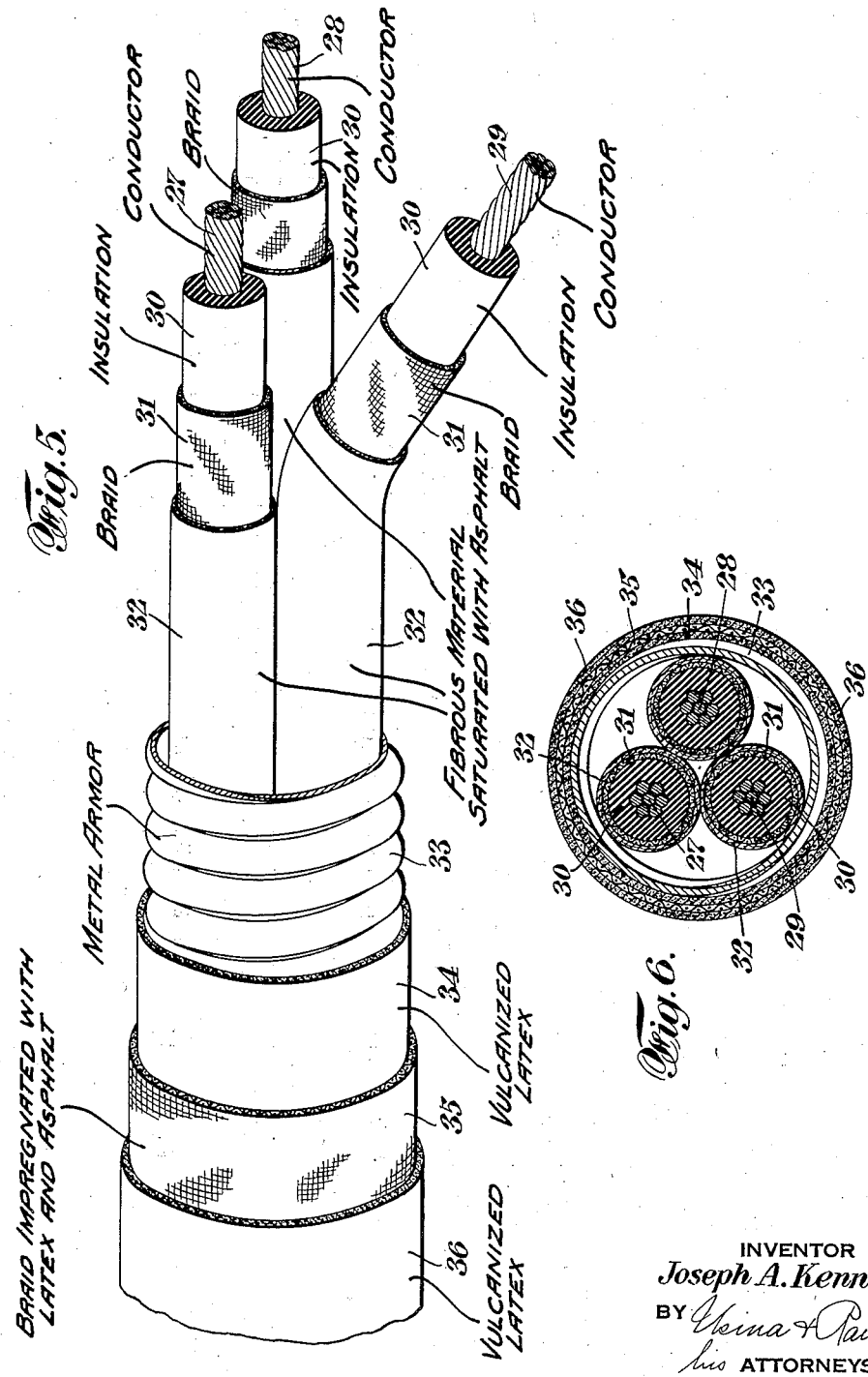
INVENTOR
Joseph A. Kennedy
BY
his ATTORNEYS Patented July 14, 1936

2,047,271

UNITED STATES PATENT OFFICE 2,047,271

INSULATED CABLE

Joseph A. Kennedy, Pawtucket, R. I., assignor to Anaconda Wire & Cable Company, New York, N. Y., a corporation of Delaware Application May 20, 1932, Serial No. 612,504

5 Claims. (Cl. 173—264)

My invention relates to insulated electric cables, particularly cables capable of being used while directly exposed to moisture and deteriorating or corrosive atmospheres such as are present in the ground and to provide a protective enclosing envelop or sheath resistant to those conditions surrounding a cable exposed to soil or adverse atmospheric conditions. The construction of insulated cable varies considerably, particularly as to the arrangement and types of insulating materials surrounding the conductors. In general, there is a layer of compounded rubber vulcanized to a greater or less extent about the conductor and then successive layers of braided or wrapped fibrous material, some or all of which may be impregnated with the waxes, pitches, or asphalted materials. Certain cables also are provided with a sheath of lead or of steel, or both, enclosing some or all of the windings, or braids of fibrous material. It has been customary heretofore, when such cables are to be laid in the earth, to enclose them in a conduit of tile or concrete to prevent direct contact with the soil, which usually contains moisture that would corrode the metallic strips or sheaths of the cable and that would deteriorate the fibrous materials and eventually expose the inner insulation, particularly if the soil water contained acids.

An object of my invention is to enclose the cable or parts thereof in a tough resilient sheath that is resistant to chemical action, such as would be occasioned by soil conditions and which would also be sufficiently tough to resist mechanical injury.

Vulcanized rubber is suitable for this purpose, as it has great toughness and strength and elasticity sufficient to resist mechanical injury and is quite resistant to acids, alkalies and other chemical reactive substances. The vulcanization of compounded crepe rubber has, however, required relatively high temperatures and for this reason has presented an obstacle to the formation of a continuous sheath because the temperatures required would affect the saturating materials used in the cable, causing them to flow or seep from position and impair the structure of the cable.

Another object of the invention is, therefore, to provide a method whereby a sheath of continuous vulcanized rubber may be formed on a cable without the necessity of using a high temperature, or such a temperature as might soften or otherwise affect insulating or saturating materials in the cable.

Other objects of the invention will more fully appear from the following description.

In my invention, a continuous sheath or covering of vulcanized rubber composition is formed on the insulating and protective structure of the cable so as hermetically to seal these structures, by applying to the insulated structure to be protected an aqueous dispersion of rubber materials. The aqueous dispersion contains colloidally suspended or dispersed particles of rubber material and of compounding and vulcanizing ingredients such as fillers of sulphur and also an ultra-accelerator capable of causing the vulcanization of the rubber at relatively low temperatures, or at temperatures below those at which the component elements of the cable structure might be injuriously affected. The dispersed rubber particles may be thus naturally occurring in the latex of trees yielding caoutchouc, balata, or of similar resins. Or, artificially formed dispersions containing reclaim or synthetic rubbers or resins may be employed. Any suitable ultra-accelerator may be selected such as one of the various xanthates of zinc, the selection of a particular accelerator from this class being a matter of choice. The proportions of sulphur and other compounding ingredients may be selected in accordance with the degree of protection desired for the protective sheath. These various ingredients are formed into a stable suspension in water, by means of suitable protective colloids. The concentration of disposed material may be that of ordinary latex, or may be concentrated or diluted, as conditions may require.

The compounded dispersion may be applied to the surface of the cable to be covered in any suitable manner, as for example by spraying onto the surface of the cable, or by successive dippings of the cable into a bath of latex, or by precipitating the dispersed particles onto the cable while the latter is passing through a bath of dispersion. The deposited dispersion may then be fixed by drying or by coagulants in the usual manner. There is thereby formed a very fine intimate and homogeneous mixture of the rubber or resins, the solid compounding ingredients such as sulphur and the ultra-accelerator. This enables ultra-accelerators to be employed which cause the vulcanization of the rubber at relatively low temperatures and which, therefore, could not be used when compounding crepe rubber on a mill owing to the heat that is generated locally in the mass of rubber on the mill. Upon slight warming of the deposited dispersion, the rubber becomes vulcanized, thereby forming a continuous tough chemically resistant sheath hermetically sealing the enclosed parts of the cable and protecting them from adverse chemical or corrosive action.

Various forms of cables embodying the invention are illustrated by way of example in the accompanying drawings, in which—

Fig. 1 is a side view of a lead sheath and steel wrapped cable covered with a vulcanized rubber according to the present invention and showing various layers of insulation stripped from the conductors to show the construction and arrangement of the insulating materials;

Fig. 2 is a cross section of the cable shown in Fig. 1;

Figs. 3 and 4 are views similar to Figs. 1 and 2 of a cable covered with wrappings of impregnated fibrous material;

Figs. 5 and 6 are views of a cable embodying the invention and which is provided with a barrel steel armor.

Referring more particularly to Figs. 1 and 2, the cable is illustrated as having a pair of conductors 10 and 11, each surrounded by a layer of rubber insulation 12 and a braided covering 13. The two insulated conductors are then enclosed in a lead sheath 14. The sheath 14 is wrapped with strands of jute 15 impregnated with asphaltic or other pitches. The wrapping of saturated jute is then covered with a wrapping of steel tape 16. This wrapping of steel tape is in turn protected by a rubber sheath or envelop 17 formed from a rubber dispersion or latex. A second wrapping 18 of saturated jute may be applied over the latex sheath 17 and covered with a second envelop or sheath 19 of vulcanized latex, which latter may be surfaced with soapstone or other powder.

Referring to Figs. 3 and 4, a single copper conductor 20 is enclosed in an insulation 21 of compounded rubber and then wrapped in a fibrous tape 22. This in turn is wrapped with strands or a serving 23 of asphalt impregnated paper. This serving is then coated with a layer of vulcanized latex 24 applied in the manner described above. A second serving 25 of impregnated paper strands and a second sheet of vulcanized latex 26 may also be applied.

In the cable shown in Figs. 5 and 6, three stranded conductors 27, 28 and 29 are each individually provided with rubber insulation 30 and a braided covering 31. They are then enclosed in a layer 32 of fibrous material saturated with asphalt. The three cables are then enclosed as a group in a spiral steel armor 33. This armor is then protected in accordance with the present invention by a layer of vulcanized latex 34 and if desired with a second layer of braid 35, which may be impregnated partly with latex and partly with a dispersion of asphalt. A final sheet or covering 36 of vulcanized latex may then be applied as described above and may be finished with any suitable powder. Through the above invention, therefore, the cable is provided with a very tough, elastic and chemically resistant sheath or envelop which hermetically seals the cable structure and protects it against the deteriorating and corrosive effects of soil conditions or adverse atmospheric conditions.

The legends on the drawings are to be interpreted by way of illustration and not by way of limitation.

What I claim is:—

1. An electric cable surrounded by a body of insulating material including a fibrous enclosure impregnated with an asphaltic saturating material which melts at relatively low temperatures and an enclosing seamless envelope of unmasticated vulcanized rubber which is the residue of an aqueous dispersion of latex which is curable at the temperature below the melting point of said asphaltic saturating material.

2. An electric cable surrounded by a body of insulating material including a wrapping of jute impregnated with asphaltic material which melts at a relatively low temperature and an enclosing seamless envelope of unmasticated vulcanized rubber which is the residue of an aqueous dispersion of latex which is curable at the temperature below the melting point of said asphaltic material.

3. An electric cable comprising a conductor surrounded by insulation including a wrapping of jute impregnated with asphaltic material of a relatively low melting point, a helical wrapping of flat steel tape around the latter, and an envelope of unmasticated vulcanized rubber which is the residue of an original dispersion of latex which is curable at a temperature below that of the melting point of said asphaltic material.

4. An insulated electric cable comprising a conductor surrounded by a body of insulation including a serving of jute impregnated with asphaltic material of a relatively low melting point, a steel tape wrapped helically around said jute covering, an envelope of latex rubber curable at a temperature below the melting point of said asphaltic material and embracing said steel tape, a second serving of asphalt impregnated jute embracing the rubber latex envelope, and an outer covering of latex rubber curable at a temperature below the melting point of the aforementioned asphaltic impregnating materials.

5. In the insulating of electric cables, the method which comprises applying a fibrous wrapping around the cable, impregnating said wrapping with a protective saturant of relatively low melting point, applying dispersed ingredients from an aqueous dispersion of compounded rubber material in a wet state to the surface of said wrapping and drying said dispersion at a temperature below the melting point of said saturant.

JOSEPH A. KENNEDY.